US006934364B1

(12) United States Patent  (10) Patent No.: US 6,934,364 B1
Ho  (45) Date of Patent: Aug. 23, 2005

(54) HANDSET IDENTIFIER USING SUPPORT VECTOR MACHINES

(75) Inventor: Purdy PinPin Ho, Boston, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 376 days.

(21) Appl. No.: 10/086,122

(22) Filed: Feb. 28, 2002

(51) Int. Cl.$^7$ .............................................. H04M 3/22
(52) U.S. Cl. .................... 379/21; 379/27.01
(58) Field of Search .............................. 379/27.01, 21, 379/26.02, 29.02; 455/563, 414.1, 465; 706/15, 706/16, 17, 12, 20; 704/246, 236, 251, 231, 704/232, 250, 256, 234, 243, 275; 389/88.01, 389/444, 93.37

(56) References Cited

U.S. PATENT DOCUMENTS

| 5,950,157 A | * | 9/1999 | Heck et al. ................. 704/234 |
| 5,970,446 A | * | 10/1999 | Goldberg et al. ........... 704/233 |
| 6,327,581 B1 | | 12/2001 | Platt |
| 6,411,930 B1 | * | 6/2002 | Burges ....................... 704/240 |

OTHER PUBLICATIONS

Burges, Christopher J.C., "A Tutorial on Support Vector Machines for Pattern Recognition," Ktuw er Academic Publishers, Boston. Manufactured in the Netherlands, p. 1-43.
Gazit, Ran et al., "Speaker Verification over Cellular Networks," Persay Ltd., 23 HaBarzel St., Tel Aviv 69710, Israel.

Heck, Larry P. et al., "Robustness to telephone handset distortion in speaker regcognition by discriminative feature design," Elsevier Science—Speech Communication 31 (2000), p. 181-192.
Heck. Larry P. et al., "Handset-Dependent Background Models For Robust Text-Independent Speaker Recognition," 1997 IEEE, p. 1071-1074.
Kishore, S.P. and Yegnanarayana, B., "Identification of Handset Type using Autoassociative Neural Networks," Indian Institute of Technology, Madras 600 036, India (1999), p. 353-356.
Reynolds, Douglas A., "HTIMIT and LLHDB: Speech Corpora for the Study of Handset Transducer Effects." 1997 IEEE, p. 1535-1538.
Reynolds, Douglas A. et al., "Speaker Verification Using Adapted Gaussian Mixture Models," Digital Signal Processing vol. 10, Nos. 1-3 (Jan./Apr./Jul. 2000), p. 19-41.
Slaney, Malcolm, "Auditory Toolbox: A M ATLAB Toolbox for Auditory Modeling Work," Version 2, Apple Computer, Inc. 1993-1994 and Interval Research Corporation 1994-1998, p. 3-52.

(Continued)

*Primary Examiner*—George Eng
*Assistant Examiner*—Barry W Taylor

(57) ABSTRACT

A system for identifying a handset used over a communication network comprises a composite database including training data for a plurality of handset types, a plurality of support vector machines trained to identify, respectively, at least one of the plurality of handset types, and an interface operable to receive audio testing data for an unidentified handset. Each support vector machine is configured to determine its degree of recognition of the audio testing data. The system also includes a processor configured to identify unidentified handset by determining the support vector machine exhibiting the highest degree of recognition.

21 Claims, 8 Drawing Sheets

OTHER PUBLICATIONS

Vapnik, Vladimir N., "Statistical Learning Theory," Chapter 10, p. 401-441; Chapter 12, p. 493-520.

MIT Center for Biological and Computational Learning, "MIT CBCL Software and Datasets," http://www.ai.mit.edu/projects/cbcl/software-datasets/index.html (Jan. 16, 2001—2 pages).

Ryan Rifkin and MIT, "SvmFu 3," http://five-percent-nation.mit.edu/SvmFu/ (Jan. 16, 2002—9 pages).

Otolith, "Linear Predictive Coding (LPC)," http://www.otolith.com/pub/u/howitt/lpc.tutorial.html (Feb. 21, 2002—4 pages).

Collobert, Ronan, "SVM Torch I—A support Vector Machine for Large-Scale Regression and Classification Problems," IDIAP, CP 592, rue du Simplon 4, 1920 Martingny, Switzerland; http://www.idiap.ch/learnings/SVMTorch.html (Jan. 16, 2002—5 pages).

* cited by examiner

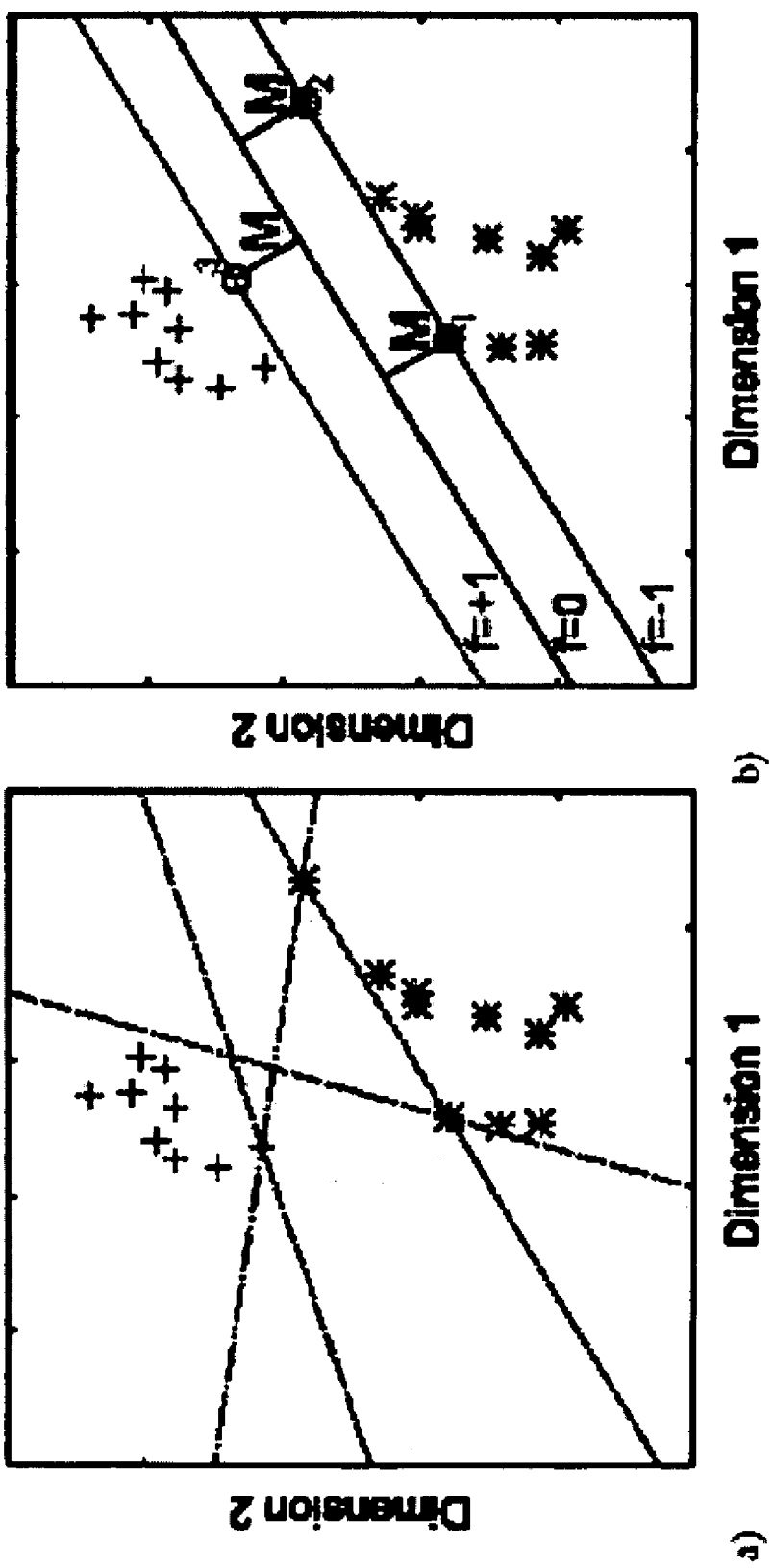

HANDSET IDENTIFIER USING SUPPORT VECTOR MACHINES

BACKGROUND

Communication over a telephonic network typically involves different handset types. Exemplary handset types may include land handsets, cellular handsets, headsets, internet telephony microphones, and still other user communications devices connectable to the network. Differences in various handsets may significantly affect the quality of voice transmitted over a network using that handset. For example, cellular phones are often more optimized for use in outdoor (or otherwise nosier) environments compared to the indoor (or otherwise more silent) environment of land phones. Thus, a cellular phone may be designed to reject weaker or background noises, which can cause a cell phone to perform poorly with speakers who do not speak directly into the mouthpiece. At the same time, cellular phone mouthpieces may fall short of many users' mouths, due to the desire to have smaller phone size that fits readily in pockets or purses. Or, cellular phones may have small microphones that are prone to being inconsistently located in front of the mouth during use, resulting in more noise in the transmitted voice. These and other factors result in performance variations among different handsets, and associated difficulties in speech processing processes. This is particularly significant in speaker verification or other processes involving identification of an individual user (i.e., identifying not only the words spoken, but also the speaker's characteristic vocal patterns). One technique for reducing the error in speech processing caused by variations in handsets is to identify (or classify) the handset type being used to transmit voice. For example, once a handset is identified, a handset-specific model may be used in speaker verification processes to more accurately identify a given speaker.

An existing handset identifier uses a "maximum likelihood" (ML) classification. ML classification typically separates multiple classes of handsets based on parametric models (e.g. Gaussian probabilistic models, see "*Speaker Verification Using Adapted Gaussian Mixture Models*," D. Reynolds, et al., Digital Signal Processing 10, pgs. 19–41 (2000)). One disadvantage of the Gaussian probabilistic models is that these models assume normal distributions. Most data to be processed do not have a normal distribution, thus, these models typically do not represent training data distribution well. ML classification may also use non-parametric models (e.g. histogramming), where the accuracy of handset identification is limited by the number and size of bins used to construct the histogram models (see "*Pattern Classification and Scene Analysis*," R. Duda and P. Hart, Wiley, 1993). Further, ML classification assumes that the usage of different handset types is of equal probability, which is generally not an accurate assumption. For example, ML classification assumes that a user having 3 types of handsets (e.g., land phone, cell phone, and headset) has a ⅓ likelihood of using each type of handset.

Another handset identifier uses a "maximum a posteriori" (MAP) classification. Like ML classification, MAP classification also employs both parametric and non-parametric models. Thus, MAP classification has the same disadvantages described above for ML classification. However, MAP is able to account for the differences in handset usage probability, and is thus superior in that regard.

Another family of classifiers, used outside the handset identification space, is known as "support vector machines" (SVMs). For example, SVMs are often used in pattern recognition (e.g., see "*The Nature of Statistical Learning*," V. Vapnik, Springer Verlag, 1995, "*Support Vector Networks*," C. Cortes and V. Vapnik, Machine Learning, 20: 1–25, 1995, and "*A Tutorial on Support Vector Machines for Pattern Recognition*," Christopher J. C. Burges, Bell Laboratories, Lucent Technologies). SVMs generally do not rely on probabilistic models or estimations of probabilities. Instead, SVMs perform binary pattern classification by determining an optimal decision surface (i.e., a hyperplane) in a domain that separates the training data into two classes (e.g., a positive class and a negative class). Once trained, the SVM can classify inputted data ("test data") received via an appropriate interface[1] as belonging to either the positive or negative class by determining which side of the decision surface the test data fall on. SVMs have not been applied to identify/classify handsets because SVMs are: (i) a relatively new technology; (ii) more complex compared to existing handset classification techniques; and (iii) generally regarded as being limited to binary classification (whereas handset classification requires n-ary classification). [1] For example, depending on the environment, the interface could be a PSTN interface (e.g., from Dialogic corporation), a radio cell, etc.

SUMMARY

A handset identification system includes a plurality of SVMs. In an exemplary embodiment, each SVM is trained to identify, respectively, at least one of various possible handset types. During use, the system receives audio data for an unidentified handset type, and each SVM determines its own degree of recognition of the audio data. The results from the SVMs are then processed to identify the unidentified handset by determining the support vector machine(s) exhibiting the greatest degree of recognition.

BRIEF DESCRIPTION OF THE FIGURES

FIG. 3A illustrates a (two-dimensional) representation of linearly separable test data in accordance with an exemplary embodiment.

FIG. 3B illustrates a decision surface and support vectors, as determined for the exemplary test data of FIG. 3A.

DETAILED DESCRIPTION

A. Overview of Operation

Figure 1:
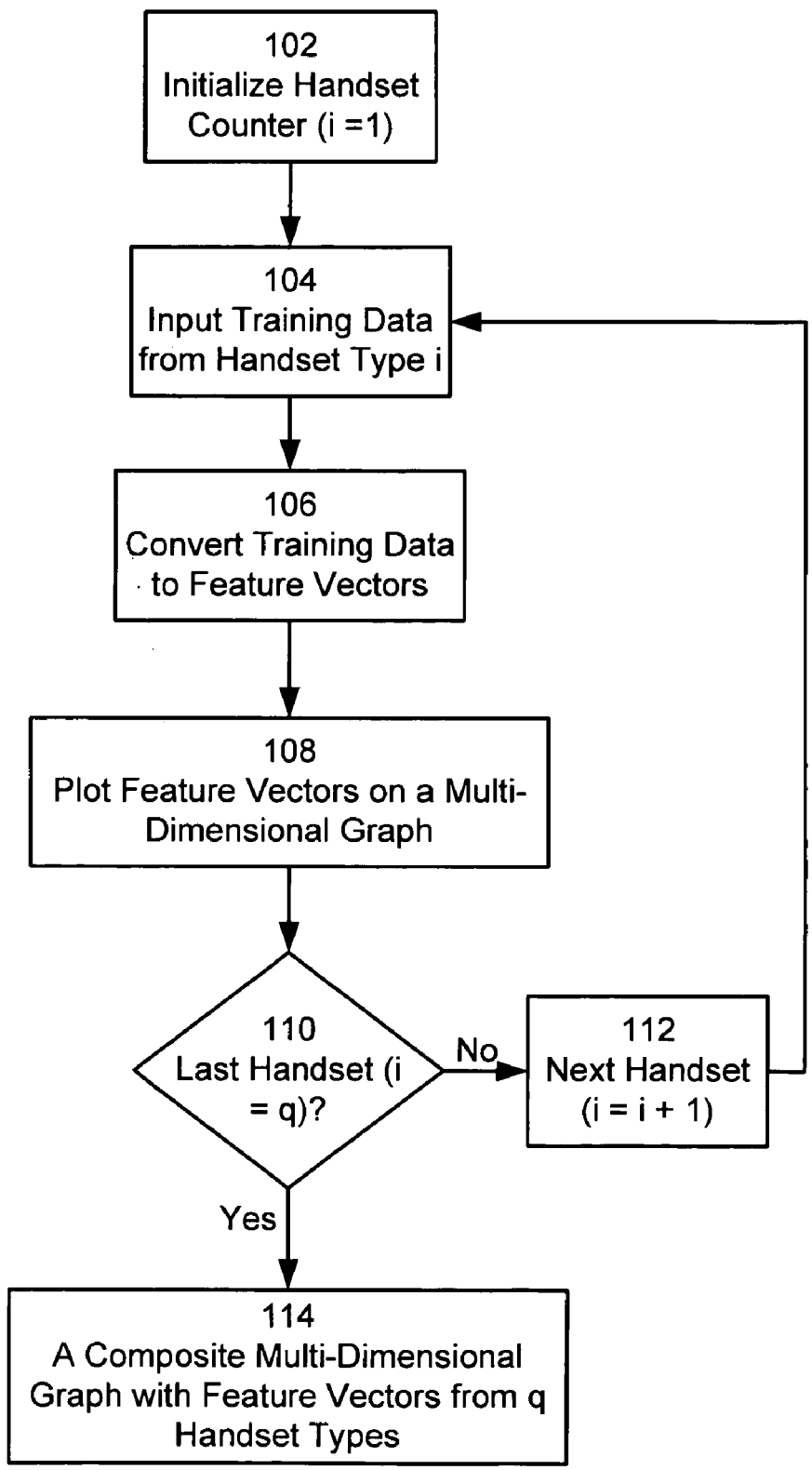
FIG. 1 illustrates processing training data to prepare feature vectors in accordance with an exemplary embodiment.

We begin with an exemplary operational overview for various embodiments, implementations and aspects.

In an exemplary embodiment, a plurality of SVMs is configured to identify a plurality of handset types. Training data received from various handsets are used to train the SVMs. In one embodiment, training data from q types of handsets are used to train q SVMs. The training data may be live or pre-recorded. The training data may also be user-specific or user-independent.

In the former case, for example, a particular user may enroll by recording training data (e.g., speech waveforms) from one or more handsets that he/she uses. This approach is typically used in speaker verification/identification applications. In the latter case, pre-recorded training data may be obtained from speech corpora (e.g., pre-recorded speech waveforms of various handsets) which is commercially available, for example, at the Linguistic Data Consortium (http://www.ldc.upenn.edu/). This approach is typically used in automatic speech recognition applications.

Further, the training data for a particular handset type may be provided via that handset, or training data of one handset type may be processed (e.g., by convolving the impulse response of the live or pre-recorded training data of one handset) to be used as training data for another handset type.

In an exemplary embodiment, the training data for the plurality of handsets are transformed into multi-dimensional "feature vectors" in a domain, such as a cepstral domain. For example, each training data sample may be transformed into a plurality of mel-frequency cepstral coefficients (MFCCs) feature vectors. In the foregoing, "cepstral" refers to a transformation of a spectrum (e.g., of the training data), "mel" is a unit of measure of perceived pitch, and "mel-frequency" refers to a type of frequency scaling that takes into account the particular manner in which the human ear is sensitive to changes in frequency.[2] Thus, MFCCs are a way of describing the shape of a spectrum, adjusted for the way the human ear perceives different sounds and at different frequencies.[3] [2] The ear is primarily responsive to linear changes in frequency below about 1 KHz, but is primarily responsive to logarithmic changes in frequency above about 1 KHz. [3] Of course, a person skilled in the art would readily recognize that training data may be transformed into other formats than MFCC feature vectors. For example, training data may be transformed via the Linear Predictive Coding technique (see http://www.otolith.com/pub/u/howitt/lpc.tutorial.html).

During the training phase, one SVM is constructed for each handset type, using the feature vectors for all handset types. It is a characteristic of the MFCCs that the feature vectors associated with a given handset type will tend to cluster together, at least relative to the feature vectors associated with other handset types. Thus, the SVM is configured to differentiate its handset from all other handsets, by separating the feature vectors for all the handsets into a distinct class representing its handset and an undifferentiated class representing all other handsets. That is, the SVM learns to recognize its handset type (by recognizing its corresponding feature vectors) from among other handset types. The SVM then determines a decision surface (which is commonly known as a hyperplane) that separates the two classes in a way that produces the largest margin between them. The decision surface may be thought of as a surface that acts to separate the two classes by a substantially equal distance.

Once trained, the plurality of SVMs can be used to determine the handset type of an unknown handset by testing the test data (e.g., speech waveform of an utterance) of the unknown handset against the plurality of SVMs. In one embodiment, the test data comprise one or more utterances by a user while placing a call using that handset. The test data are converted to feature vectors using the MFCC process and then tested against the trained SVMs. In an exemplary embodiment, the converted feature vectors are the inputs to each of the trained SVMs and normalized outputs from each of the trained SVMs are determined. In one embodiment, the distances between the test data's feature vectors and each SVM's decision surface are determined. The normalized output from each SVM is the average distance among all the distances between the test data's feature vectors and the SVM's decision surface. This average distance is called the characteristic distance. A positive distance represents a positive correlation, and a negative distance represents a negative correlation. By comparing the characteristic distances from the SVMs, the SVM that returns the maximum positive characteristic distance is determined, and the handset type associated with the positive class defined by that SVM is returned as the handset type of the unknown handset which provided the test data.

In general, the farther away a feature vector is from the decision surface, the more accurate the classification result. In some cases, it is not possible to reliably determine a single maximum characteristic distance. For example, there might be a plurality of closely spaced positive characteristic distances, or the maximum characteristic distance might be too low (the closer to the decision surface, the less certain the identification of the handset), or there might be no positive result at all. Various embodiments are disclosed for determining the most likely handset, and/or updating the training data set and SVM family to incorporate previously unrecognized handsets, in these scenarios.

Having stated the foregoing exemplary overview, we now return to the beginning (namely, training), and describe the various embodiments, implementations and aspects in greater detail.

B. Processing Training Data

In this exemplary embodiment, the system is trained to identify a plurality of handset types. The plurality of handset types to be identified may be obtained from publicly or commercially available databases (see, e.g., the Lincoln Laboratory Handset Database (LLHDB) at www.ldc.upenn.edu), and/or may be generated. Training data from each of the handset types are used to train the system. In an exemplary embodiment, training data may be obtained by capturing spoken inputs using representative handsets of the plurality of handset types. Training data may be user-independent or user-specific. In some cases, when training data are available for a first handset type, and a transform function (or an impulse response) is known which relates the acoustic response of the first handset type to that of a second handset type, the training data from the first handset type may be converted to form training data for the second handset type. Alternatively, when generating speaker specific training data and a speaker who provided the training data for a first handset is no longer available to provide training data for other handsets, it is possible to clone the speaker's recorded speech (using well known speech conversion technology) to generate training data for the other handsets. In general, the system may be configured to default to pre-recorded training data (e.g., from the speech corpora), process a user's voice to generate training data, and/or extend training data from one handset type to another in order to generate new training data using previously recorded speech samples (e.g., obtained from the speech corpora or from a live recording).

FIG. 1 illustrates an exemplary process for inputting the training data, and producing feature vectors therefrom representing the plurality of handset types. For convenience, let there be q handset types, designated as 1 to q. First, a handset counter i is initialized (step 102). The training data for handset type i are then inputted (step 104), and the training data are converted into feature vectors (step 106). In an exemplary embodiment, this is done by breaking the training data into small time segments (or frames), and computing mel-frequency cepstral coefficients (MFCCs) for each of the frames.

As a specific example, suppose that there are 4 handsets. Suppose further that 10 utterances of 30 seconds duration each, from each of the 4 handset types, are used as training data to train 4 SVMs. Each handset has a 300 second long record, and there are 4 handsets, so there is in total 1200 seconds of training data. Further suppose that each second of an utterance is divisible into 100 frames. In that case, the 1200 seconds of training data will result in approximately 120 thousand frames being available to train the SVMs.

The transformation process can be implemented using a wide variety of publicly or commercially available protocols (see, e.g., "*Auditory Toolbox: A Matlab Toolbox for Auditory Modeling Work,*" Malcolm Slaney, Interval Research Corporation, Version 2, page 29 for one exemplary protocol), and need not be described in further detail here. In many exemplary protocols, each segment of the training data is converted into a feature vector comprising "n" MFCCs (i.e., an n-dimensional feature vector, for example, n=13).

The feature vectors are plotted on a multi-dimensional graph,[4] in this example, a 13-dimensional graph (step 108). Next, it is determined whether the handset counter (i) has reached the last handset index (q) (step 110). If not, there are more training data from other handset types to be processed. Thus, i is incremented to refer to the next handset type (denoted by index i+1) (step 112), and the process repeats (step 104). Referring back to step 110, if i is equal to q, then training data from all of the q handset types have been processed.[4] The graph is a convenient format for visualization. Those skilled in the art will readily understand how to represent such a graph in actual computer implementations using memory, data structures, and/or databases. Thus, these terms are used interchangeably herein to denote any storage medium capable of storing a representation of the graph. Similarly, the term graph is used herein to denote not only a visual graph, but also any corresponding forms in which it may be represented in a computer environment.

The result is a composite multi-dimensional graph including feature vectors representing training data for q handset types (step 114). In this graph, the feature vectors from each handset type are preferably tagged or otherwise configured to be distinguishable from those of each other handset type. For example, when training the $q^{th}$ SVM, the feature vectors of the $q^{th}$ handset may be labeled +1 and the feature vectors of the other handsets may be labeled −1.

C. Training the SVMs

The feature vectors, representing training data for q handset types, are now used to train a plurality of SVMs. The actual choice of software for training SVM is flexible, in accordance with the implementation needs of the particular system. Many implementations of SVM training software are publicly or commercially available (see, e.g., SVMFoo at www.ai.mit.edu/projects/cbcl/software-datasets/index.html), and need not be described in greater detail herein. In an exemplary embodiment, q SVMs are trained via the same type of SVM training software. Although this is not strictly required, it is often desirable for purposes of consistency and fidelity.

Figure 2:
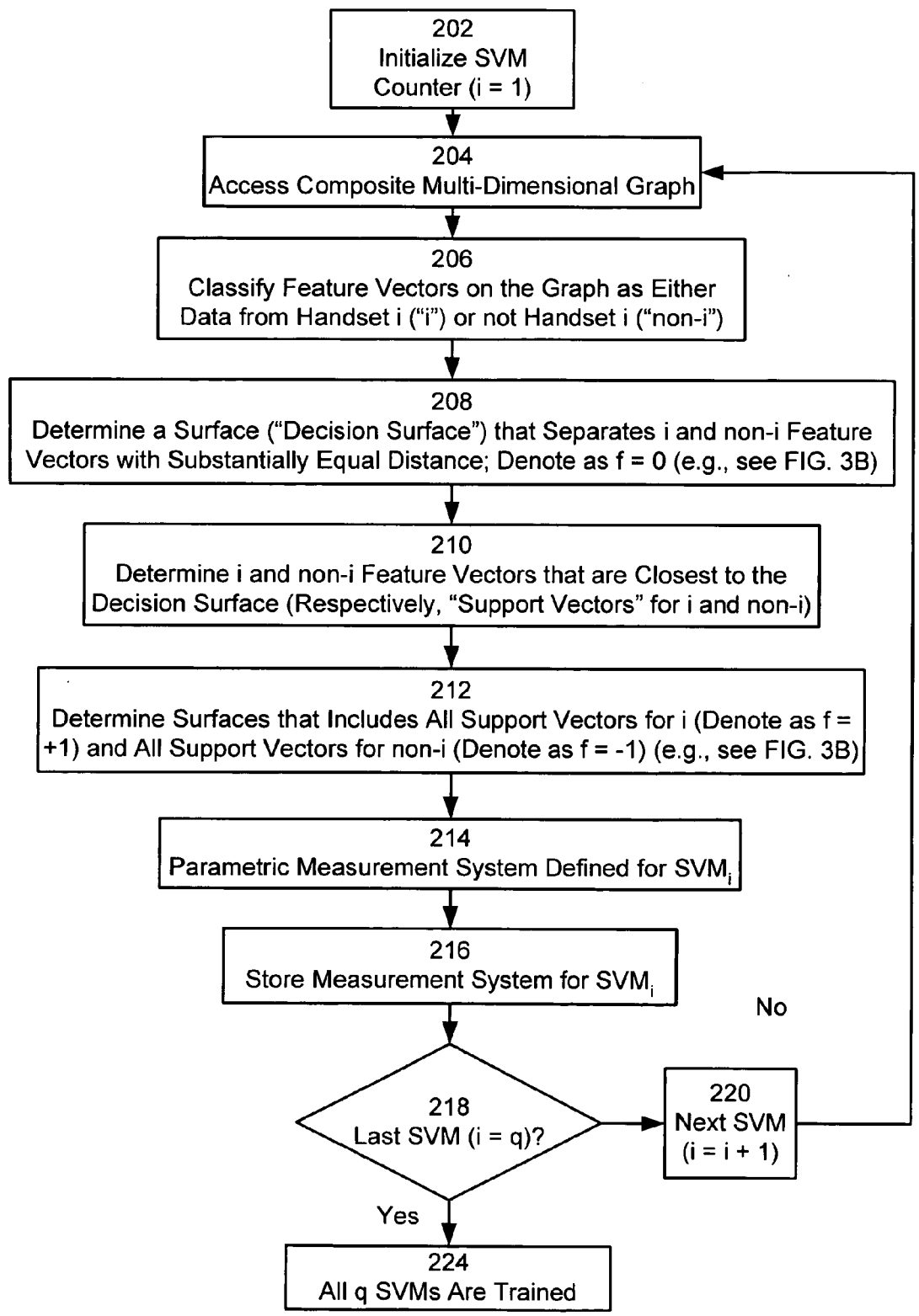
FIG. 2 illustrates an SVM training process in accordance with an exemplary embodiment.

FIG. 2 illustrates an exemplary process for training q SVMs. For convenience, let there be q SVMs,[5] designated as 1 to q. First, an SVM counter i is initialized (step 202). Next, the composite multi-dimensional graph (hereinafter, the "graph") is accessed (step 204). Feature vectors on the graph are classified as either feature vectors from handset type "i" (hereinafter, the "i feature vectors") or not from handset type "i" (hereinafter, the "non-i feature vectors") (step 206). That is, $SVM_i$ is being trained to differentiate i feature vectors from non-i feature vectors, without necessarily distinguishing among the non-i feature vectors. Thus, the feature vectors are separated into two distinct classes.[5] This is typically the case, although not strictly required. For example, it is possible to use a training data set from q handset types to train less than q SVMs.

Next, a so-called "decision surface" (generally, a hyperplane) is generated that separates the i and non-i feature vectors (i.e., the two classes) in a way that produces the largest margin between them (step 208). Thus, the decision surface, which is denoted as f=0 (step 208), represents a surface of maximum uncertainty, in that any feature vector falling on the decision surface is equally likely to belong to, and not belong to, handset type i. In general, the decision surface may be thought of as a surface that acts to separate the two classes by a substantially equal distance.

Next, the i and non-i feature vectors that are closest to the decision surface (the so-called "i and non-i support vectors," respectively) are determined (step 210). Two additional surfaces, representing the i and non-i support vectors, are determined, respectively (step 212). The i surface is denoted as f=+1, and the non-i surface is denoted as f=−1. Therefore, the region between the two support vector surfaces (f=+1 and f=−1), can be thought of as a "no-man's land" or "uncertainty area" in which feature vectors can neither be determined as belonging to handset type i or to some other type using the available training data.

Having now defined surfaces f=−1, f=0, and f=+1, it is apparent that f can serve as a parametric descriptor of the distance of any feature vector from the decision surface (step 214). The measurement system thus defined for $SVM_i$ is stored in a database or otherwise (step 216). In general, the farther a test feature vector is from the decision surface, the more likely it is to be properly classified as being the correct type of handset.

Next, it is determined whether the last SVM has been trained (i=q) (step 218). If not, there are one or more additional SVMs to be trained, i is incremented to refer to the next SVM (denoted by index i+1) (step 220), and the process repeats (step 204). Referring back to step 218, if i is equal to q, then all q SVMs have been trained (step 224).

FIGS. 3A and 3B are graphs representing a training process of an SVM in accordance with an exemplary embodiment. In FIGS. 3A and 3B, i feature vectors are represented by crosses (+) and non-i feature vectors are represented by asterisks (*). For ease of representation on a two-dimensional paper diagram, the feature vectors in FIGS. 3A and 3B are represented as having only two dimensions, even though in general there may be more (e.g., 13 dimensions when using the exemplary SVM protocol described earlier).

In FIG. 3A, the two-dimensional lines represent possible candidates for the decision surface. In FIG. 3B, the actual decision surface (denoted by f=0) is that surface which separates the two classes (i vs. non-i) of feature vectors by substantially equal distance (denoted by M). The support vectors are the feature vectors that are closest to the decision surface and are indicated by circles in FIG. 3B. The surfaces determined by the support vectors from each class of feature vectors are denoted by f=+1 for the i feature vector class and f=−1 for the non-i feature vector class. After determining the f=+1 surface and the f=−1 surface, the measurement system for the SVM has been determined.

D. Determining a Handset Type

1. An Exemplary Embodiment

Figure 4A:
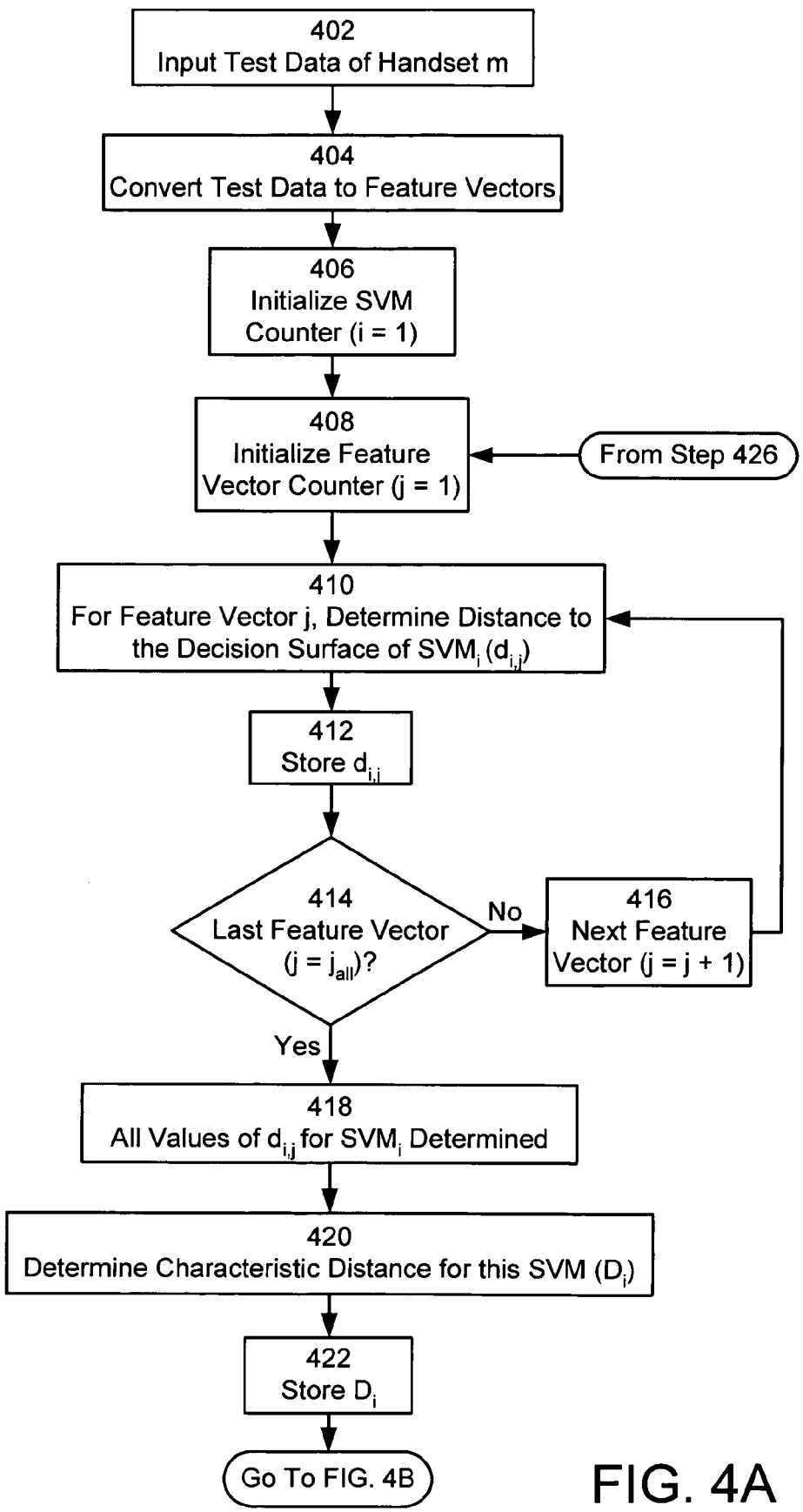
FIGS. 4A and 4B illustrate a testing process in accordance with an exemplary embodiment.
Figure 4B:
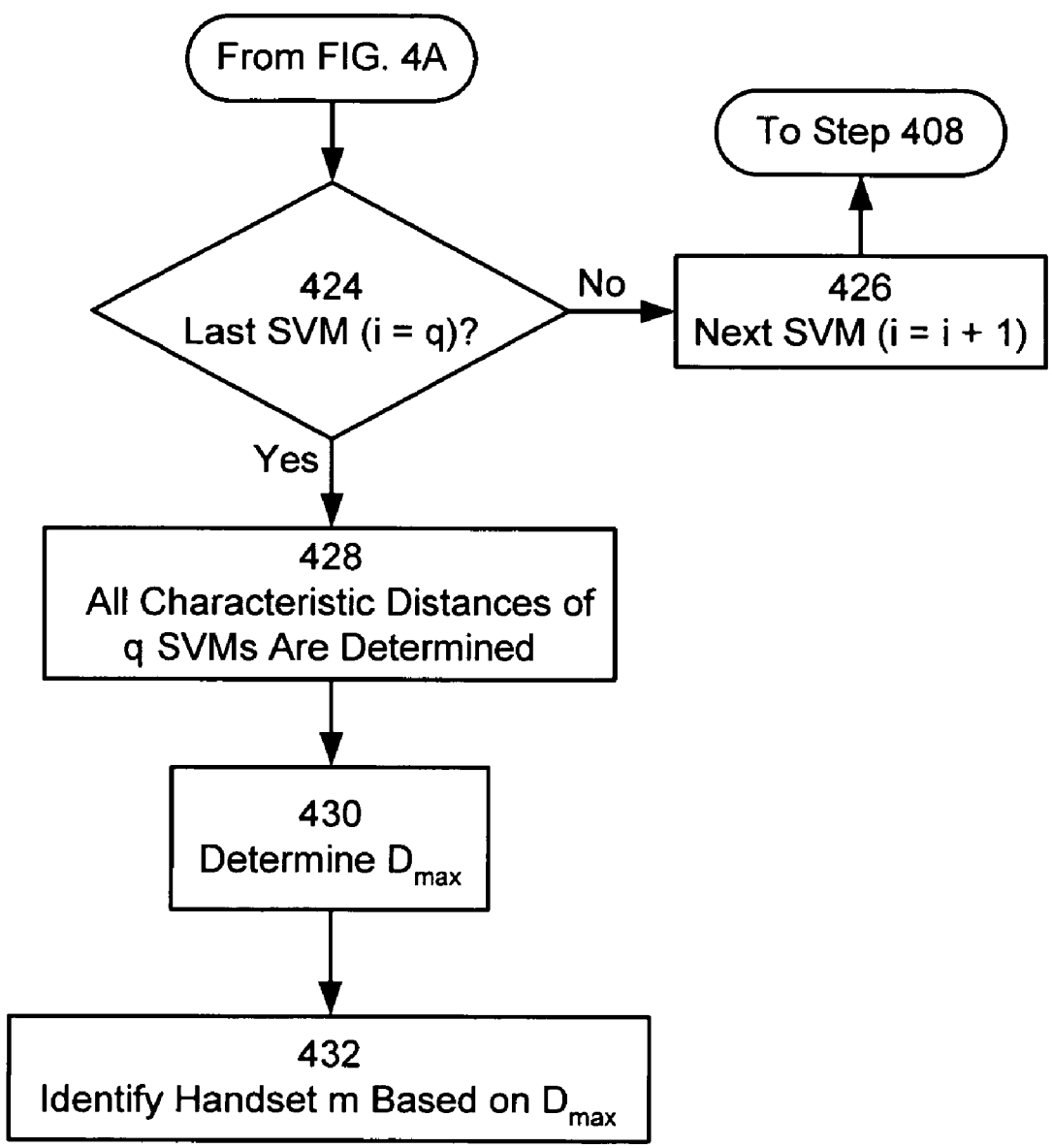

FIGS. 4A and 4B illustrate a testing process for determining the handset type of a handset "m" in accordance with an exemplary embodiment. In FIG. 4A, test data of this handset m are inputted (step 402). In an exemplary embodiment, test data comprise one or more utterances provided by a user using handset m. The test data are converted to feature vectors (step 404) in the manner previously described for the training data.

The feature vectors for these test data are tested against each of the q SVMs, one at a time. An SVM counter i is initialized (step 406), and also a feature vector counter j (step 408). For each feature vector j of the test data, the distance $d_{i,j}$ between it and the decision surface in $SVM_i$ is determined (step 410). The value of $d_{i,j}$ is stored in a database or otherwise (step 412). Next, it is determined whether the feature vector counter (j) has reached the last feature vector ($j_{all}$) (step 414). Here, $j_{all}$ is equal to the total number of feature vectors converted from the test data. If j is not equal to $j_{all}$, one or more feature vectors still need to be tested in $SVM_i$. Thus, j is incremented to refer to the next feature vector (denoted by index j+1) (step 416) and the process repeats (step 410). Referring back to step 414, if j is equal to $j_{all}$, all feature vectors have been tested by $SVM_i$, and all values of distances from the decision plane of $SVM_i$ have been determined (step 418).

Next, all values of $d_{i,j}$ are processed to determine a characteristic distance ($D_i$) of $SVM_i$ (step 420). In an exemplary embodiment, the characteristic distance $D_i$ of $SVM_i$ is the average distance (e.g., linear or square-root-of-sum-of-squares) of all values of $d_{i,j}$. In another exemplary embodiment, the characteristic distance $D_i$ of $SVM_i$ is determined by summing all positive values of $d_{i,j}$, then divide that sum by the total number of feature vectors. In any event, the value of the characteristic distance $D_i$ for this $SVM_i$ is stored in a database or otherwise (step 422), and the process continues in FIG. 4B.

In FIG. 4B, it is determined whether the SVM counter (i) has reached the last SVM (q) (step 424). If not, the feature vectors converted from the test data are to be tested in one or more additional SVMs. Thus, i is incremented to refer to the next SVM (denoted by index i+1) (step 426) and the process repeats (step 408). Referring back to step 424, if i is equal to q, the values of the characteristic distances $D_i$ have been determined for all q SVMs (step 428). Next, the values of the characteristic distances are compared to each other, and the highest positive value ($D_{max}$) is determined (step 430). The handset type of handset m is then determined based on which SVM index i is associated with $D_{max}$ (step 432). In an exemplary implementation, the determination is typically performed using a software program running on a computer processor and operably connected to the plurality of SVMs, where the SVMs themselves could be implemented in a combination of hardware and/or software.

2. Another Exemplary Embodiment

Figure 5A:
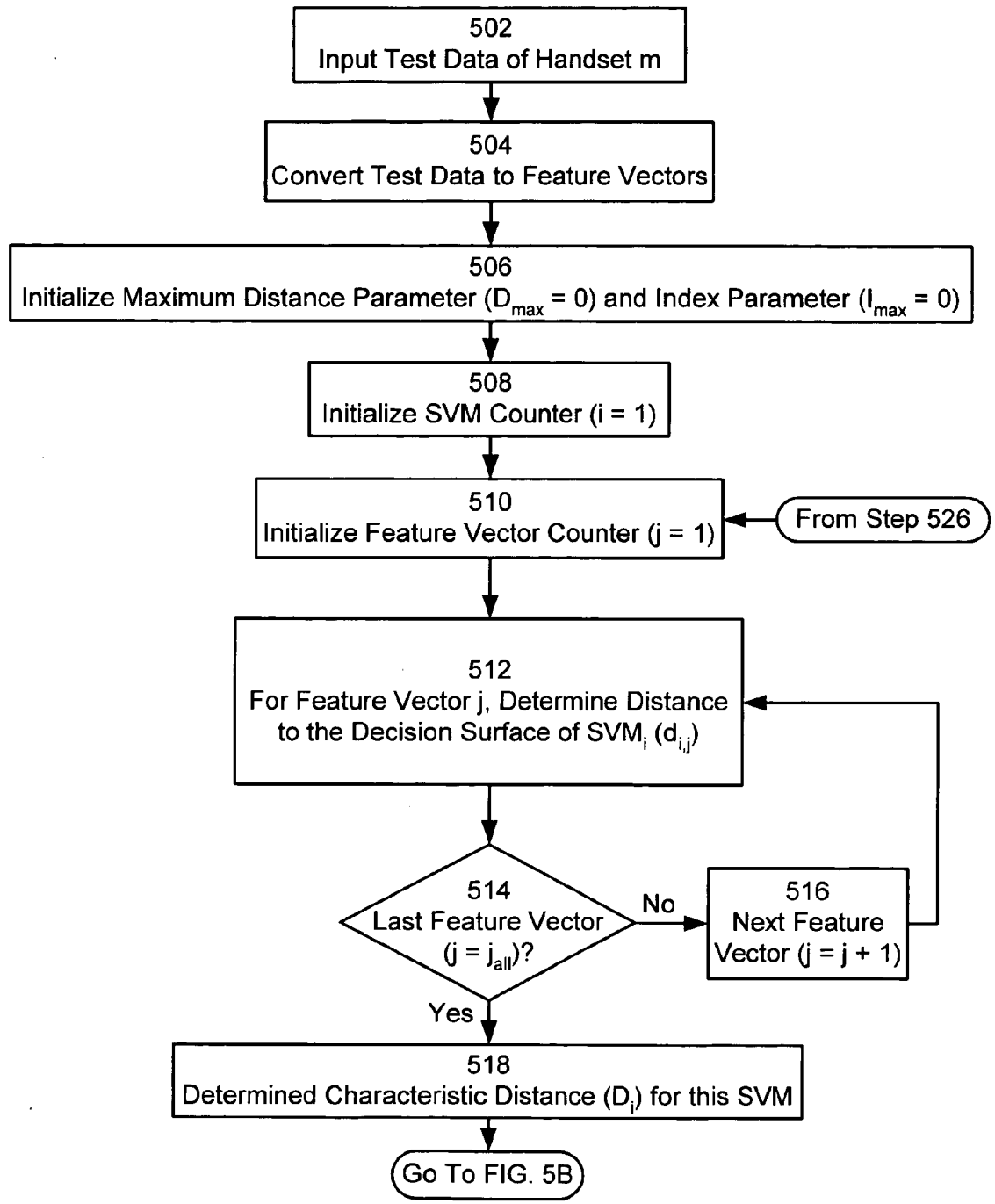
FIGS. 5A and 5B illustrate another testing process in accordance with an exemplary embodiment.
Figure 5B:
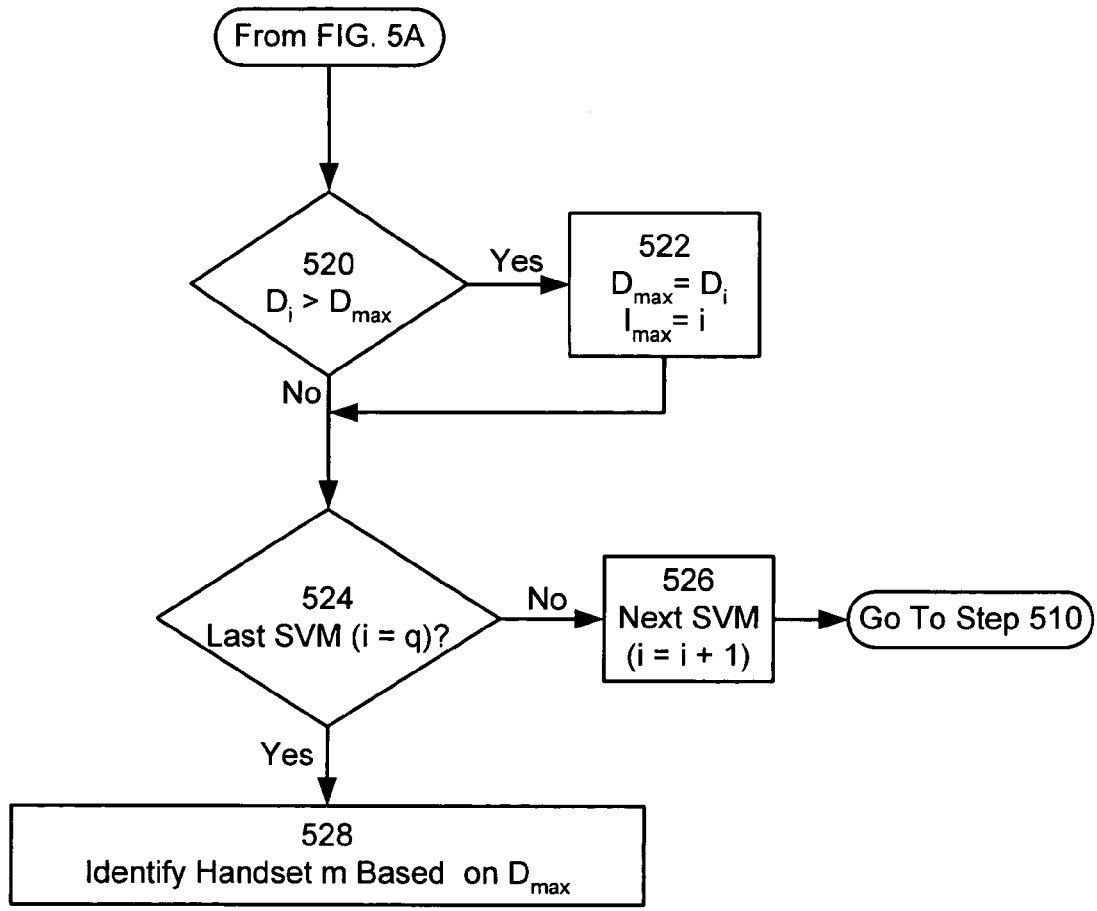

FIGS. 5A and 5B illustrate another testing process in accordance with another exemplary embodiment in which the characteristic distance described in FIGS. 4A and 4B is simply chosen to be the maximum distance of any feature vector from the decision plane.

In FIG. 5A, test data of this handset m are inputted (step 502). In an exemplary embodiment, test data comprise one or more utterances provided by a user using handset m. The test data are converted to feature vectors (step 504) in the manner previously described. A maximum distance parameter $D_{max}$, and a corresponding index parameter $I_{max}$, are initialized (step 506). An SVM counter i is also initialized (step 508).

The feature vectors for these test data are tested against each of the q SVMs, one at a time. For each feature vector j of the test data, the distance $d_{i,j}$ between it and the decision surface of $SVM_i$ is determined (step 512).

Next, it is determined whether the feature vector counter (j) has reached the last feature vector $j_{all}$) (step 514). Here, $j_{all}$ is equal to the total number of feature vectors converted from the test data. If j is not equal to $j_{all}$, one or more feature vectors still need to be tested in $SVM_i$. Thus, j is incremented to refer to the next feature vector (denoted by index j+1) (step 516) and the process repeats (step 512). Referring back to step 514, if j is equal to $j_{all}$, all feature vectors have been tested in $SVM_i$. Next, all values of $d_{i,j}$ are processed to determine a characteristic distance ($D_i$) of $SVM_i$(step 518). Referring now to FIG. 5B, if $D_i$ exceeds the current value of the maximum distance parameter $D_{max}$, then $D_{max}$ and $I_{max}$ are updated (steps 520 and 522). It is determined whether the SVM counter (i) has reached the last SVM (q) (step 524). If not, the feature vectors converted from the test data are to be tested in one or more additional SVMs. Thus, i is incremented to refer to the next SVM (denoted by index i+1) (step 526) and the process repeats (step 510). Referring back to step 524, if i is equal to q, the maximum distance parameter ($D_{max}$) for any SVM has been determined. The handset type of handset m is then determined based on the value of the SVM index $I_{max}$ which is associated with $D_{max}$ (step 528).

3. Other Exemplary Embodiments

In the foregoing exemplary embodiments, each SVM was trained to recognize a single handset type, and an unidentified handset was identified by testing it against each of the SVMs. Of course, those skilled in the art will readily appreciate that various modifications to the foregoing are possible.

For example, it is not necessary to test every known handset type, when it is known that the unidentified handset type belongs to a finite set. This could, for example, be determined by a handset family identifier transmitted from certain handsets in certain implementations. Or, the configuration of a particular system might only operate with a finite number of handset types. In any such finite set system, one need only test as many handset types as required to identify the unidentified type by a process of elimination.

It is also not always necessary that each SVM uniquely recognize only a single handset type. For example, groups of handset types (e.g., those made by the same manufacturer, using the same components, etc.) may share some common characteristics. In such a case, their feature vectors will tend to cluster together in a manner that is distinguishable from all other handset types. Accordingly, one or more SVMs can be trained to identify groups of handset types. Each such group could be further divided into sub-groups, each sharing common characteristics identifiable by another SVM. In this way, it is possible to implement a sort of "binary search" protocol in which one successively winnows the set of possible handset types until the handset is identified. For example, a first SVM could distinguish cellular handsets from other types, a second SVM could distinguish Qualcomm cellphones from other types, a third SVM could distinguish piezoelectric microphone Qualcomm models from ceramic microphone Qualcomm models, and so on.

E. Handling Low-Reliability Results

In trying to classify a handset using q SVMs, one looks for the maximum positive characteristic distance among all of the SVMs. If the set of maximum positive characteristic distance (say, in $SVM_k$) includes a single dominant positive characteristic distance, this indicates a strong likelihood of a positive identification of the handset as being of type k.

However, the smaller the maximum characteristic distance, the less reliable the identification. Indeed, if the maximum characteristic distance is a very low in magnitude (i.e., less than 1), then one is in the uncertainty area where $SVM_i$ cannot determine whether the handset is of type i or otherwise. Similarly, when the maximum characteristic distance is only a small positive number, the prediction may also be unreliable.

Alternatively, whatever the magnitude of the maximum positive characteristic distance, it may be poorly differentiated from the next-closest values (from other SVMs), again, making prediction unreliable.

In any of the foregoing or other cases where prediction is unreliable or where no positive result is available for making a prediction, it may be desirable to prompt the user to confirm the handset type.

Figure 6:
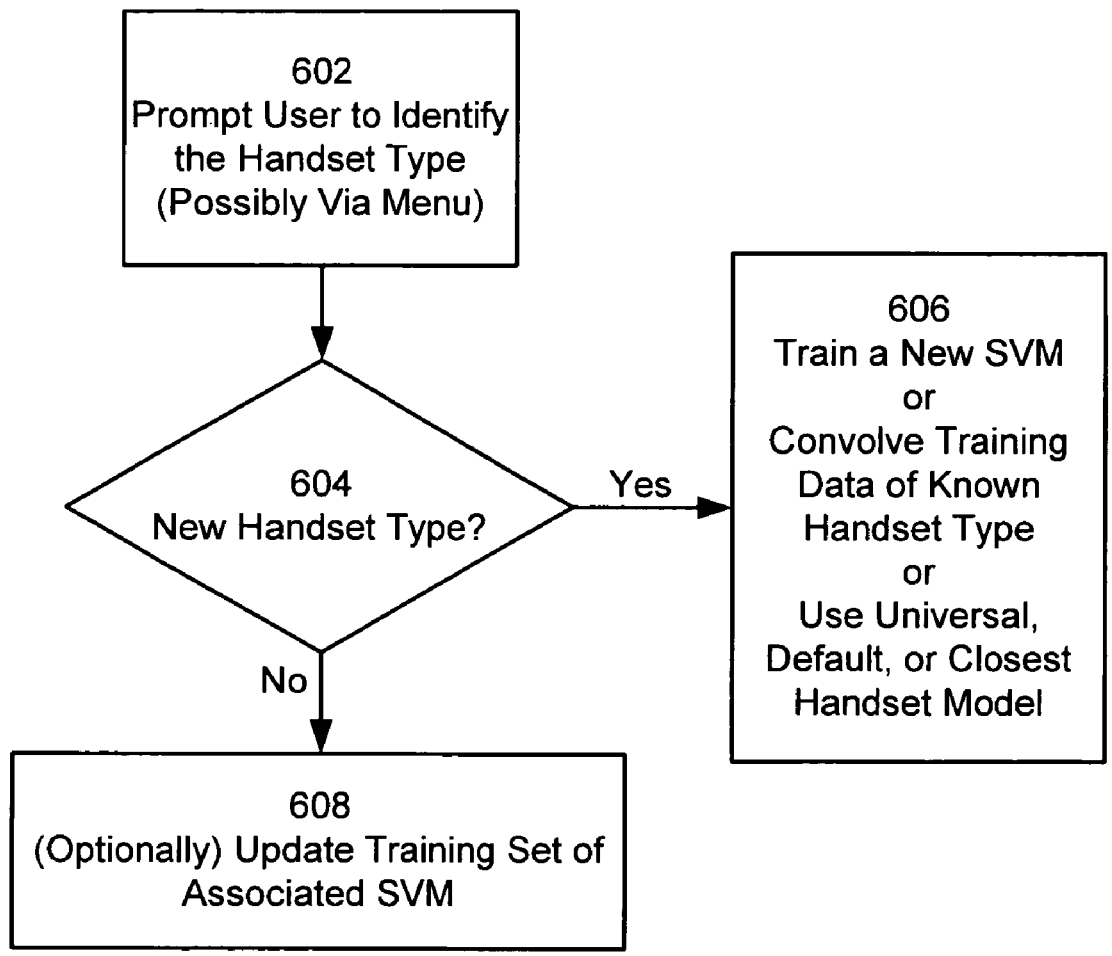
FIG. 6 illustrates a process for handling low-reliability results in accordance with an exemplary embodiment.

FIG. 6 illustrates an exemplary process for handling low-reliability results. The user who provided the test data may be asked (via a text-to-speech module or otherwise) to identify a handset type (step 602). For example, if the system narrowed the handset types to three possible types, it may prompt the user to choose among the three handset types. If none of the choices is the right handset type or if no choice is provided, the user may be asked to specify a new handset type. In the case of a new handset type (step 604), a new SVM may be trained for the new handset type (step 606).

In an exemplary embodiment, the new SVM may be trained based at least in part on the provided test data, and/or additional training data obtained from other sources. As described above, the latter might even include test data converted from known training data of another handset type. For example, test data may be obtained by recording "live" test data from a user using a handset of the new handset type, deconvolve the test data with existing training data of a known handset type to obtain the impulse response of the new handset type, then re-convolve the existing training data of the known handset type with the impulse response of the new handset type.

Alternatively, instead of (or prior to) training a new SVM, the system might use a universal handset model (perhaps a composite of uncommon handset types where training data from all the uncommon handset types within the universal class are considered to be in the positive class in this SVM, or alternatively, an average for all known handset types), a default handset model (perhaps representing the most commonly used handset) or the closest available handset model. All of these represent, to some degree, an "approximation" to the user's handset model.

Referring back to step 604, if the handset type identified by the user is not a new handset type (step 608), the system may add the user's test data to the training database in order to improve future predictions for that handset type.

F. Conclusion

In all the foregoing descriptions, the various subsystems, modules, databases, channels, and other components are merely exemplary. In general, the described functionality can be implemented using the specific components and data flows illustrated above, or still other components and data flows as appropriate to the desired system configuration. For example, those skilled in the art will appreciate that other computer-implemented classifiers involving transformation of temporal data to frequency based multi-dimensional domains may be substituted for the exemplary support vector machines described herein. Those skilled in the art will also readily appreciate that the various components can be implemented in hardware, software, or a combination thereof. Thus, the foregoing examples illustrate certain exemplary embodiments from which other embodiments, variations, and modifications will be apparent to those skilled in the art. The inventions should therefore not be limited to the particular embodiments discussed above, but rather is defined by the claims.

I claim:

1. A method for training a computer-implemented classification system to be able to identify a handset used over a communication network, comprising:
    (a) transforming training data for a plurality of handset types into a composite dataset including training feature vectors;
    (b) configuring a plurality of classifiers based on said composite dataset, including:
        (1) associating one of said classifiers with one of said handset types not previously associated with any other of said classifiers;
        (2) training said classifier of (1) to recognize, within said composite dataset, (A) a first class of training feature vectors related to said associated handset type, and (B) a second class of training feature vectors related to other handset types;
        (3) repeating (1) and (2) for at least another of said classifiers; and
    (c) storing a result of (b) in a computer-readable memory so as to be usable to (i) correlate an unidentified handset's test feature vectors against said trained classifiers, (ii) select one of said classifiers exhibiting the greatest correlation, and (iii) determine said handset type associated with said selected classifier.

2. The method of claim 1, where said training data for at least one of said handset types is not obtained directly via said handset, but rather derived from training data obtained via another said handset using an acoustic model of said another handset.

3. The method of claim 1, further comprising updating said audio training data using additional test data obtained upon attempting to use said plurality of said classifiers to identify said unidentified handset.

4. A method for identifying a handset used over a communication network, comprising:
    (a) accessing a plurality of classifiers, each of which has been trained to recognize a handset type by differentiating between a plurality of feature vectors associated with said handset type and a plurality of feature vectors associated with other handset types:
        (i) said feature vectors for each said handset having been derived by transforming audio training data obtained therefrom into a multi-dimensional domain;
    (b) obtaining test data from a handset to be identified;
    (c) transforming said test data into a plurality of test feature vectors in said multi-dimensional domain;
    (d) determining the degree of correlation between said test feature vectors and a first class of one of said classifiers;
    (e) repeating (d) for at least another of said classifiers; and (f) identifying said handset in (b) as being of said handset type associated with a classifier in (d) or (e) which exhibits the highest of said correlations.

5. The method of claim 4 further comprising updating training data based on test data obtained from said handset type in (b).

6. The method of claim 5 further comprising training a new classifier based on said obtained test data.

7. The method of claim 4, where (f) includes:
(a) determining a plurality of correlations from which a single dominant positive correlation cannot be reliably determined;
(b) determining said handset types associated with said correlations in (a); and
(c) querying a user of said unidentified handset to confirm one of said handset types as being said unidentified handset type.

8. The method of claim 7 further comprising using an approximate handset model, in response to said user's inability to confirm one of said handset types.

9. A computer-implemented classification system for identifying a handset used over a communication network, comprising:
(a) a composite database, including training feature vectors obtained by transforming training data for a plurality of handset types;
(b) a plurality of classifiers that have been trained based on said composite database:
 (i) each classifier associated with at least one handset type;
 (ii) each classifier configured to recognize, within said composite database, (A) a first class of training feature vectors related to said associated handset type(s), and (B) a second class of training feature vectors related to other handset types;
(c) said classifiers comprising a classification system configured to:
 (i) correlate an unidentified handset's test feature vectors against said trained classifiers;
 (ii) select one of said classifiers exhibiting the greatest correlation; and
 (iii) determine said handset type associated with said selected classifier.

10. A method for identifying a handset used over a communication network, comprising:
(a) obtaining audio training data for a plurality of handset types;
(b) training each of a plurality of support vector machines to identify; respectively, at least one of said plurality of handset types;
(c) receiving audio testing data for an unidentified handset;
(d) determining the degree of recognition, of said audio testing data, by one of said plurality of support vector machines;
(e) determining the degree of recognition of said audio testing data by at least another of said plurality of support vector machines; and
(f) classifying said unidentified handset by determining the highest degree of recognition in (d) and (e).

11. The method of claim 10 where:
(b) includes training each of said support vector machines to identify a unique one of said handset types; and
(f) includes interrogating as many of said support vector machines as needed to classify said unidentified handset to a desired degree of accuracy.

12. The method of claim 10 where:
(b) includes training at least one support vector machine to identify a plurality of said handset types; and
(f) includes performing at least one round of a binary search process using said support vector machine trained to identify a plurality of handset types.

13. A system for identifying a handset used over a communication network, comprising:
(a) a data storage configured to contain training data for a plurality of handset types;
(b) a plurality of support vector machines trained to identify, respectively, at least one of said plurality of handset types;
(c) an interface operable to receive audio testing data for an unidentified handset;
(d) each support vector machine configured to determine its degree of recognition of said audio testing data;
(e) a processor configured to identify said unidentified handset by determining the support vector machine exhibiting the highest degree of recognition in (d).

14. A computer-readable medium for training a computer-implemented classification system to be able to identify a handset used over a communication network, comprising logic instructions that, if executed:
(a) transform training data for a plurality of handset types into a composite dataset including training feature vectors in a multi-dimensional domain;
(b) configure a plurality of classifiers based on said composite dataset, including:
 (1) associate one of said classifiers with one of said handset types not previously associated with any other of said classifiers;
 (2) train said classifier of said (1) to recognize, within said composite dataset, (A) a first class of training feature vectors related to said associated handset type, and (B) a second class of training feature vectors related to other handset types;
 (3) repeat said (1) and (2) for at least another of said classifiers; and
(c) store a result of said (b) in a computer-readable memory so as to be usable to (i) correlate an unidentified handset's test feature vectors against said trained classifiers, (ii) select one of said classifiers exhibiting the greatest correlation, and (iii) determine said handset type associated with said selected classifier.

15. A computer-readable medium for identifying a handset used over a communication network, comprising logic instructions that, if executed:
(a) access a plurality of classifiers, each of which has been trained to recognize a handset type by differentiating between a plurality of feature vectors associated with said handset type and a plurality of feature vectors associated with other handset types:
 (i) said feature vectors for each said handset having been derived by transforming audio training data obtained therefrom into a multi-dimensional domain;
(b) obtain test data from a handset to be identified;
(c) transform said test data into a plurality of test feature vectors in said multi-dimensional domain;
(d) determine the degree of correlation between said test feature vectors and a first class of one of said classifiers;
(e) repeat said (d) for at least another of said classifiers; and
(f) identify said handset in (b) as being of said handset type associated with a classifier in (d) or (e) which exhibits the highest of said correlations.

16. A computer-readable medium for identifying a handset used over a communication network, comprising:
   (a) logic code for obtaining audio training data for a plurality of handset types;
   (b) logic code for training each of a plurality of support vector machines to identify, respectively, at least one of said plurality of handset types;
   (c) logic code for receiving audio testing data for an unidentified handset;
   (d) logic code for determining the degree of recognition, of said audio testing data, by one of said plurality of support vector machines;
   (e) logic code for determining the degree of recognition of said audio testing data by at least another of said plurality of support vector machines; and
   (f) logic code for classifying said unidentified handset by determining the highest degree of recognition in said (d) and (e).

17. A computer-implemented classification system trained to be able to identify a handset used over a communication network, comprising:
   (a) means for transforming training data for a plurality of handset types into a composite dataset including training feature vectors in a multi-dimensional domain;
   (b) means for configuring a plurality of classifiers based on said composite dataset, including:
      (1) means for associating one of said classifiers with one of said handset types not previously associated with any other of said classifiers;
      (2) means for training said classifier of said (1) to recognize, within said composite dataset, (A) a first class of training feature vectors related to said associated handset type, and (B) a second class of training feature vectors related to other handset types;
      (3) means for repeating said (1) and (2) for at least another of said classifiers; and
   (c) means for storing a result of said (b) in a computer-readable memory so as to be usable to (i) correlate an unidentified handset's test feature vectors against said trained classifiers, (ii) select one of said classifiers exhibiting the greatest correlation, and (iii) determine said handset type associated with said selected classifier.

18. A system for identifying a handset used over a communication network, comprising:
   (a) means for accessing a plurality of classifiers, each of which has been trained to recognize a handset type by differentiating between a plurality of feature vectors associated with said handset type and a plurality of feature vectors associated with other handset types:
      (i) said feature vectors for each said handset having been derived by transforming audio training data obtained therefrom into a multi-dimensional domain;
   (b) means for obtaining test data from a handset to be identified;
   (c) means for transforming said test data into a plurality of test feature vectors in said multi-dimensional domain;
   (d) means for determining the degree of correlation between said test feature vectors and a first class of one of said classifiers;
   (e) means for repeating said (d) for at least another of said classifiers; and
   (f) means for identifying said handset in (b) as being of said handset type associated with a classifier in (d) or (e) which exhibits the highest of said correlations.

19. A computer-implemented classification system for identifying a handset used over a communication network, comprising:
   (a) a composite storage, said storage including training feature vectors obtained by transforming training data for a plurality of handset types;
   (b) a plurality of classifiers that have been trained based on said composite storage means:
      (i) each classifier associated with at least one handset type;
      (ii) each classifier configured to recognize, within said composite storage means, (A) a first class of training feature vectors related to said associated handset type(s), and (B) a second class of training feature vectors related to other handset types;
   (c) said classifiers comprising a classification system including:
      (i) means for correlating an unidentified handset's test feature vectors against said trained classifiers;
      (ii) means for selecting one of said classifiers exhibiting the greatest correlation; and
      (iii) means for determining said handset type associated with said selected classifier.

20. A system for identifying a handset used over a communication network, comprising:
   (a) means for obtaining audio training data for a plurality of handset types;
   (b) means for training each of a plurality of support vector machines to identify, respectively, at least one of said plurality of handset types;
   (c) means for receiving audio testing data for an unidentified handset;
   (d) means for determining the degree of recognition, of said audio testing data, by one of said plurality of support vector machines;
   (e) means for determining the degree of recognition of said audio testing data by at least another of said plurality of support vector machines; and
   (f) means for classifying said unidentified handset by determining the highest degree of recognition in said (d) and (e).

21. A system for identifying a handset used over a communication network, comprising:
   (a) storage means for storing training data for a plurality of handset types;
   (b) a plurality of classifier means trained to identify, respectively, at least one of said plurality of handset types;
   (c) an interface means for receiving audio testing data for an unidentified handset type;
   (d) each classifier means configured to determine its degree of recognition of said audio testing data;
   (e) a processor means for identifying said unidentified handset by determining the classifier means exhibiting the highest degree of recognition in (d).

* * * * *